(12) United States Patent
Koyama

(10) Patent No.: US 9,300,968 B2
(45) Date of Patent: Mar. 29, 2016

(54) IMAGE PROCESSING DEVICE, IMAGE DISPLAY DEVICE, AND PROJECTOR

(75) Inventor: Fumio Koyama, Shiojiri (JP)

(73) Assignee: SEIKO EPSON CORPORATION, Tokyo (JP)

(\*) Notice: Subject to any disclaimer, the term of this patent is extended or adjusted under 35 U.S.C. 154(b) by 377 days.

(21) Appl. No.: 13/488,752

(22) Filed: Jun. 5, 2012

(65) Prior Publication Data

US 2013/0009966 A1 Jan. 10, 2013

(30) Foreign Application Priority Data

Jul. 4, 2011 (JP) ................................ 2011-148006

(51) Int. Cl.
G06T 1/00 (2006.01)
G06K 9/36 (2006.01)
H04N 19/12 (2014.01)

(52) U.S. Cl.
CPC ..................................... H04N 19/12 (2014.11)

(58) Field of Classification Search
CPC ... H04N 19/00078; H04N 19/12; H04N 1/60; H04N 5/228; G06T 1/00; G06K 9/00
See application file for complete search history.

(56) References Cited

U.S. PATENT DOCUMENTS

| 6,195,462 B1* | 2/2001 | Bryniarski et al. ........... 382/239 |
| 2002/0118183 A1 | 8/2002 | Inuzuka et al. | |
| 2005/0012754 A1 | 1/2005 | Inuzuka et al. | |
| 2007/0120864 A1* | 5/2007 | Uzawa et al. ................. 345/581 |
| 2007/0200838 A1* | 8/2007 | Lee et al. ...................... 345/204 |
| 2009/0290046 A1* | 11/2009 | Kita ......................... 348/231.99 |
| 2010/0289914 A1* | 11/2010 | Shinomiya ................. 348/222.1 |
| 2011/0032552 A1* | 2/2011 | Ishii .............................. 358/1.9 |

FOREIGN PATENT DOCUMENTS

| JP | H09-190392 A | 7/1997 |
| JP | 2001-177830 A | 6/2001 |
| JP | 2002-262243 A | 9/2002 |
| JP | 2004-193818 A | 7/2004 |
| JP | 2006-308934 A | 11/2006 |
| JP | 2010-147709 A | 7/2010 |
| JP | A-2010-183328 | 8/2010 |

OTHER PUBLICATIONS

Othman Khalifa, "Wavelet Coding Design for Image Data Compression," The International Arab Journal of Information Technology, vol. 2, No. 2, Apr. 2005, p. 118-127.*

\* cited by examiner

*Primary Examiner* — Sing-Wai Wu
(74) *Attorney, Agent, or Firm* — Oliff PLC

(57) ABSTRACT

An image processing device adapted to perform image processing on an image signal input, and then output the image signal includes an interface section adapted to perform input and output of the image signal in process with a storage device located outside the image processing device, and connected to the image processing device, a compression processing section adapted to compress the image signal output from the interface section to the storage device, and a compression rate setting section adapted to set a compression rate used when compressing the image signal in the compression processing section.

16 Claims, 4 Drawing Sheets

IMAGE PROCESSING DEVICE, IMAGE DISPLAY DEVICE, AND PROJECTOR

BACKGROUND

1. Technical Field

The present invention relates to an image processing device, an image display device, and a projector for performing image processing on an image signal.

2. Related Art

An image processing LSI provided to an image display device and so on is connected to an external frame buffer (frame memory) as a storage device composed of a DRAM or the like, and performs a variety of image processing while storing the image signal into the frame buffer. Since the band frequency (the data transfer capacity) of the frame buffer becomes insufficient if the process using the frame buffer increases due to sophistication in function of the image display device, there has been used in recent years the technology of compressing the image signal before writing the image signal into the frame buffer in order for reducing the data amount to be transferred to the frame buffer (see, e.g., JP-A-2010-183328).

However, if the image signal is compressed, the higher the compression ratio is, the more the image is deteriorated. Therefore, if priority is given to the image quality, since it is not allowed to set the compression ratio to so high, the sufficient band frequency of the frame buffer might fail to be provided depending on the use environment, the operation circumstances, and so on. On the other hand, if the bus width is expanded or the clock frequency is raised in order to provide the sufficient band frequency, the necessary number of DRAMs might increase or expensive DRAMs might be required, and therefore, the price of the device might rise. As described above, in the image processing LSI having the configuration of the related art, it is difficult to efficiently perform the image processing using the frame buffer.

SUMMARY

An advantage of some aspects of the invention is to solve at least a part of the problems described above, and the invention can be implemented as one of the following forms or application examples.

One application example is directed to an image processing device adapted to perform image processing on an image signal input, and then output the image signal including an interface section adapted to perform input and output of the image signal in process with a storage device to be connected to the image processing device, a compression processing section adapted to compress the image signal output from the interface section to the storage device, and a compression rate setting section adapted to set a compression rate used when compressing the image signal in the compression processing section. The image processing device may include a decompression processing section adapted to decompress the image signal input from the storage device into the interface section.

According to the image processing device, since it is arranged that the image signal input to and output from the storage device is compressed, and at the same time the compression rate used when performing the compression can be set, it becomes possible to set an appropriate compression rate corresponding to the use environment and the operation circumstances, and it becomes possible to efficiently perform the image processing using the storage device.

In the image processing device according to the application example described above, it is preferable that the compression processing section includes a plurality of compression circuits capable of compressing the image signal at respective compression rates different from each other, and the compression rate setting section selects the image signal compressed by one of the plurality of compression circuits.

According to this image processing device, since one of the image signals respectively compressed by the plurality of compression circuits is selected, it becomes possible to realize the setting of the compression rate with a simple configuration.

In the image processing device according to the application example described above, it is preferable that the compression rate setting section changes the compression rate in accordance with a load condition of the image processing.

According to this image processing device, since the compression rate is set in accordance with the load condition of the image processing, it becomes possible to perform the compression at an appropriate compression rate corresponding to the load condition.

In the image processing device according to the application example described above, it is preferable that there is included a plurality of image processing sections adapted to perform respective image processing different from each other, and each of the plurality of image processing sections includes the compression processing section.

According to this image processing device, since each of the image processing sections for performing the respective image processing different from each other has the compression processing section, the control of the compression, and the control of the input and the output of the storage device become easy.

In the image processing device according to the application example described above, it is preferable that the compression rates of the respective compression processing sections provided to the respective image processing sections can be set individually.

According to this image processing device, since the compression rates of the plurality of compression processing sections can be set individually, it becomes possible to perform the compression at an appropriate compression rate in accordance with the processing condition of each of the image processing sections.

In the image processing device according to the application example described above, it is preferable that there is further provided a frame rate conversion processing section adapted to convert a frame rate of the image signal, and the compression processing section performs the compression of the image signal output from the frame rate conversion processing section to the storage device.

According to this image processing device, since the compression processing section performs the compression of the image signal processed by the frame rate conversion processing section, it becomes possible to prevent the shortage of the band frequency when performing the frame rate conversion process with the load apt to become heavy.

In the image processing device according to the application example described above, it is preferable that there is further provided a keystone correction processing section adapted to correct keystone distortion caused when projecting an image based on the image signal, and the compression processing section performs the compression of the image signal output from the keystone correction processing section to the storage device.

According to this image processing device, since the compression processing section performs the compression of the image signal processed by the keystone correction processing section, it becomes possible to prevent the shortage of the band frequency when performing the keystone correction process with the load apt to become heavy.

One application example is directed to an image display device including the image processing device according to any one of the application examples described above, the storage device, and a display section adapted to display an image based on the image signal output from the image processing device.

According to this image display device, advantages substantially the same as in the image processing device according to any one of the application examples described above can be obtained.

One application example is directed to a projector including the image processing device according to any one of the application examples described above, the storage device, and a projection section adapted to display an image based on the image signal output from the image processing device.

According to this projector, advantages substantially the same as in the image processing device according to any one of the application examples described above can be obtained.

BRIEF DESCRIPTION OF THE DRAWINGS

The invention will be described with reference to the accompanying drawings, wherein like numbers reference like elements.

DESCRIPTION OF AN EXEMPLARY EMBODIMENT

An image processing device according to the present embodiment will hereinafter be explained with reference to the accompanying drawings.

The image processing device according to the present embodiment is installed inside the projector as an image display device. The projector displays an image based on an image signal supplied from an external image supply device by projecting it on, for example, a screen or a wall surface.

Figure 1:
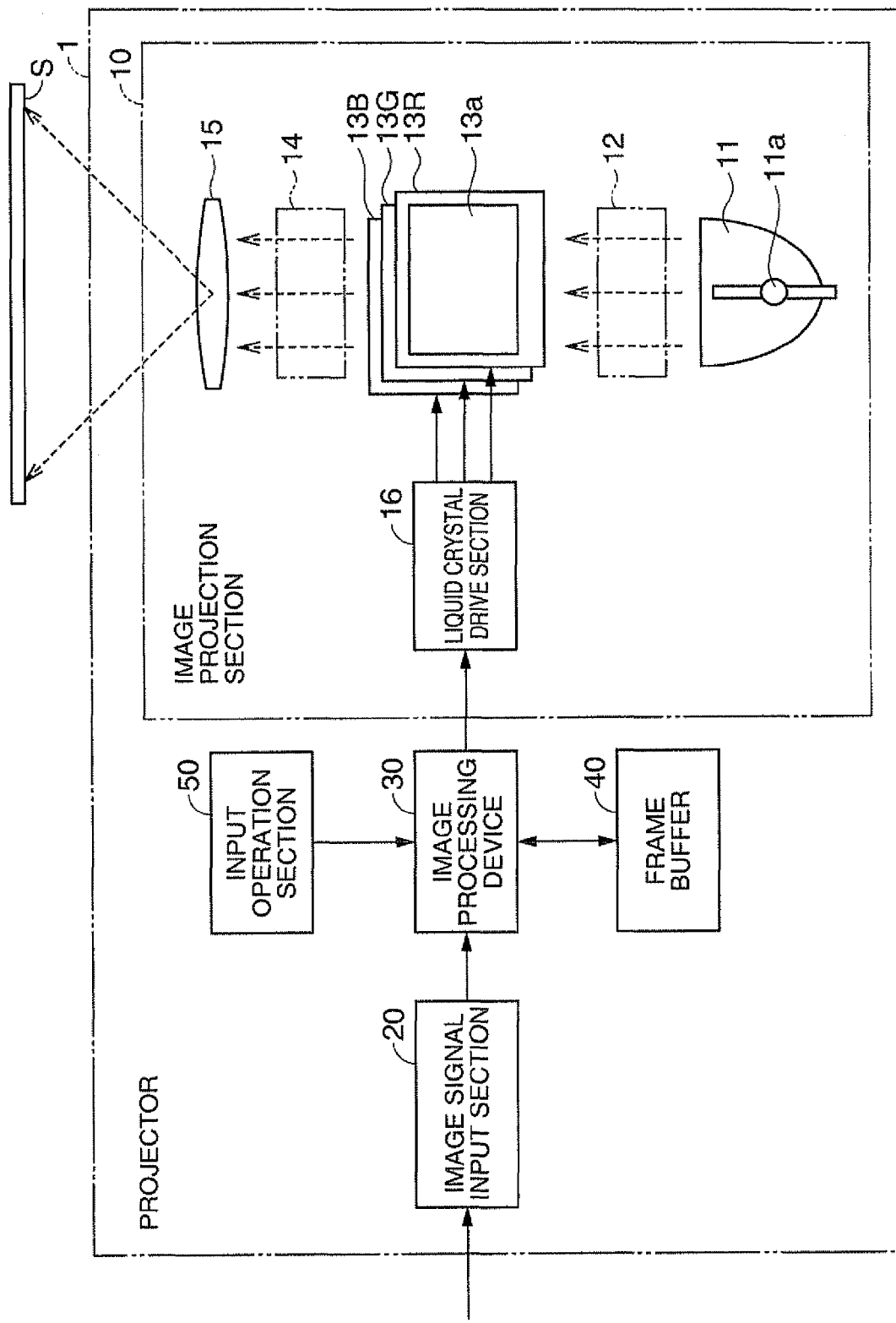
FIG. 1 is a block diagram showing a schematic configuration of a projector according to an embodiment of the invention.

FIG. 1 is a block diagram showing a schematic configuration of the projector.

As shown in FIG. 1, the projector 1 is provided with an image projection section (a projection section) 10, an image signal input section 20, an image processing device 30, a frame buffer 40 as a storage device, and an input operation section 50.

The image projection section 10 is configured including an illumination optical system 11, a colored light separation optical system 12, three liquid crystal light valves 13R, 13G, and 13B as a light modulating device, a colored light combining optical system 14, a projection lens 15 as a projection optical system, a liquid crystal drive section 16, and so on. The image projection section 10 corresponds to a display section, and modulates the light emitted from the illumination optical system 11 based on the image signal output from the image processing device 30 and then projects it to thereby display an image on a projection surface S.

The illumination optical system 11 is configured including a light source lamp 11a as a light source device such as a super-high pressure mercury lamp or a metal halide lamp. The light emitted from the illumination optical system 11 is separated into colored light components of red (R), green (G), and blue (B) as the three primary colors of light by a colored light separation optical system 12, and the colored light components subsequently enter the liquid crystal light valves 13R, 13G, and 13B, respectively.

The liquid crystal light valves 13R, 13G, and 13B are each composed mainly of a liquid crystal panel having a liquid crystal material encapsulated between a pair of transparent substrates. The liquid crystal light valves 13R, 13G, and 13B are each provided with a pixel area 13a having a rectangular shape and a plurality of pixels (not shown) arranged in a matrix, and arranged so that a drive voltage can be applied to the liquid crystal material pixel by pixel. When the liquid crystal drive section 16 applies the drive voltage corresponding to the image signal input thereto to each of the pixels, each of the pixels is set to have a light transmission corresponding to the image signal. Therefore, the colored lights separated into by the colored light separation optical system 12 are modulated by being transmitted through the pixel areas 13a of the liquid crystal light valves 53R, 53G, and 53B, respectively, and thus the image light having the grayscale corresponding to the image signal is formed for each of the colored lights. The image lights of the respective colors thus formed are combined pixel by pixel by the color combining optical system 14 to be formed as the color image light, and then projected on a projection surface S in an enlarged manner by the projection lens 15.

To the image signal input section 20, there are input a variety of types of image signals from an external image supply device not shown such as a video reproduction device or a personal computer. The image signal input section 20 converts the image signal input thereto into a digital image signal, and then outputs it to the image processing device 30. It should be noted that the image signal output from the image signal input section 20 includes the data (the pixel values) representing the grayscales of the respective colors of RGB pixel by pixel.

The image processing device 30 performs various image processing such as resizing on the image signal input from the image signal input section 20, and then outputs the image signal thus processed to the liquid crystal drive section 16. The image processing device 30 is connected to the frame buffer 40 configured including the dynamic random access memory (DRAM), and performs the various image processing while temporarily storing the image signal in process into the frame buffer 40.

The input operation section 50 is for receiving an input operation of the user, and is provided with a plurality of operation keys for providing various instructions to the projector 1. When the user operates the variety of operation keys of the input operation section 50, the input operation section 50 outputs an operation signal corresponding to the content of the operation by the user to the image processing device 30 in response to the input operation. It should be noted that it is also possible to adopt a configuration of using a remote controller (not shown) capable of a remote operation as the input operation section 50. In this case, the remote controller emits an operation signal on an infrared ray corresponding to the content of the operation by the user, and then a receiving section not shown receives the operation signal and transmits it to the image processing device 30.

Figure 2:
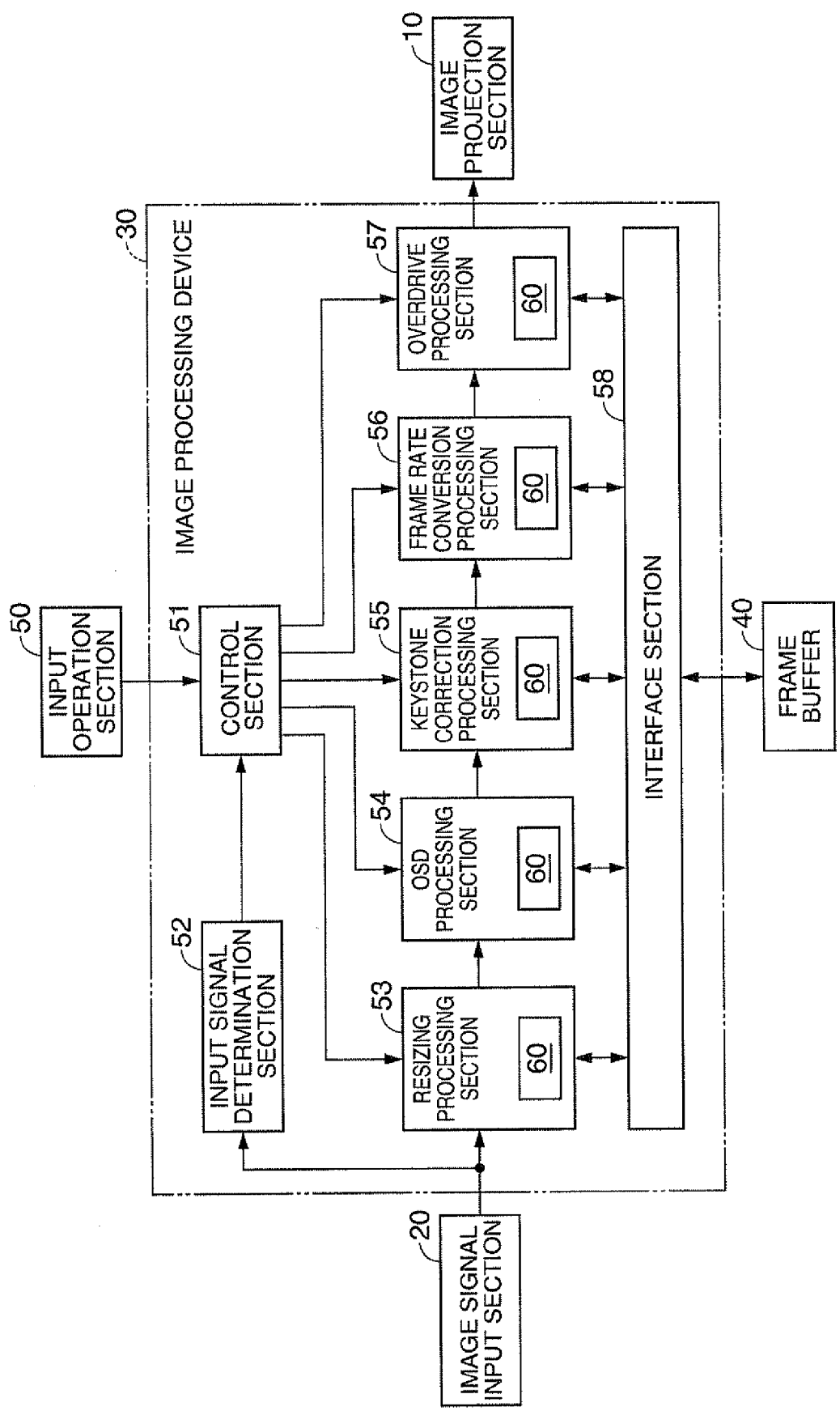
FIG. 2 is a block diagram showing a detailed configuration of an image processing device according to the embodiment.

FIG. 2 is a block diagram showing a detailed configuration of the image processing device 30.

As shown in FIG. 2, the image processing device 30 is configured including a control section 51, an input signal determination section 52, a resizing processing section 53, an OSD processing section 54, a keystone correction processing section 55, a frame rate conversion processing section 56, an overdrive processing section 57, and an interface section 58. It should be noted that the resizing processing section 53, the OSD processing section 54, the keystone correction processing section 55, the frame rate conversion processing section 56, and the overdrive processing section 57 correspond to the image processing section for performing the image processing on the image signal, and are therefore hereinafter also described collectively as "image processing sections 53 through 57."

The control section 51 is provided with a central processing unit (CPU), and a memory for storing a control program, setting data, and so on, and integrally controls the operation of the image processing device 30 by the CPU operating in accordance with the control program stored in the memory. In other words, the control section 51 functions as a computer.

The input signal determination section 52 determines the resolution (the number of pixels) and the frame rate of the image signal input from the image signal input section 20, and then outputs the determination result to the control section 51.

The resizing processing section 53 performs the resizing process for adjusting the resolution of the image signal to the resolution of the liquid crystal light valves 13R, 13G, and 13B on the image signal input from the image signal input section 20 based on the instruction of the control section 51. Specifically, the control section 51 makes the resizing processing section 53 perform the resizing process in accordance with the resolution of the image signal determined by the input signal determination section 52. Then, the resizing processing section 53 performs a process for thinning out the pixel values of the image signal if the resolution of the image signal input thereto is higher than the resolution of the liquid crystal light valves 13R, 13G, and 13B, or performs a process of interpolating the pixel values of the image signal if the resolution of the image signal input thereto is lower than the resolution of the liquid crystal light valves 13R, 13G, and 135. The resizing processing section 53 outputs the image signal after the processing to the OSD processing section 54.

Based on an instruction of the control section 51, the OSD processing section 54 performs a process for displaying an on-screen display (OSD) image such as a menu image or a message image superimposed on the image (the input image) based on the image signal. The control section 51 makes the OSD processing section 54 display the menu image in accordance with the input operation of the user to the input operation section 50. Further, if an error occurs in the projector 1, for example, the control section 51 makes the OSD processing section 54 display the message image. The OSD processing section 54 is provided with an OSD memory not shown, and stores the OSD image information representing figures, fonts, and so on for forming the OSD image. When the control section 51 instructs the superimpose display of the OSD image, the OSD processing section 54 reads out the necessary OSD image information from the OSD memory, and then combines the OSD image information with the image signal input from the resizing processing section 53 so that the OSD image is superimposed at a predetermined position on the projection image. The image signal combined with the OSD image information is then output to the keystone correction processing section 55. It should be noted that in absence of the instruction from the control section 51 of superimposing the OSD image, the OSD processing section 54 output the image signal, which is input from the resizing processing section 53, directly to the keystone correction processing section 55.

The keystone correction processing section 55 performs the keystone correction process for correcting the keystone distortion caused when projecting the image in an oblique direction to the projection surface S based on the instruction of the control section 51. Specifically, the keystone correction processing section 55 sets an image formation area (not shown) having a shape capable of canceling the keystone distortion inside the pixel area 13a of each of the liquid crystal light valves 13R, 13G, and 13B. Then, the keystone correction processing section 55 corrects the image signal input from the OSD processing section 54 so that the input image is formed in the image formation area, and at the same time, sets the pixels outside the image formation area to the pixel value corresponding to black, namely the pixel value with which the light transmission becomes the minimum. The keystone correction processing section 55 outputs the image signal after the correction to the frame rate conversion processing section 56. The control section 51 determines whether or not the correction is performed, the extent of the correction, and so on in accordance with the input operation of the user to the input operation section 50. Alternately, it is also possible to arrange that a detection section for detecting the tilt or the like of the projector 1 is provided, and whether or not the correction is performed and the extent of the correction is determined in accordance with the detection result of the detection section. It should be noted that in absence of the instruction from the control section 51 of correcting the keystone distortion, the keystone correction processing section 55 outputs the image signal, which is input from the OSD processing section 54, directly to the frame rate conversion processing section 56. In this case, the entire pixel area 13a becomes the image formation area, and the input image is formed in the entire pixel area 13a.

The frame rate conversion processing section 56 performs a process of converting the frame rate of the image signal input from the image signal input section 20 into a predetermined frame rate (e.g., 60 Hz) for performing display in the liquid crystal light valves 13R, 13G, and 13B based on the instruction of the control section 51. Specifically, the control section 51 makes the frame rate conversion processing section 56 perform the frame rate conversion process in accordance with the frame rate of the image signal determined by the input signal determination section 52. Then, the frame rate conversion processing section 56 performs a process for interpolating the frames if the frame rate of the image signal input thereto is lower than the predetermined frame rate, or performs a process of thinning out the frames if the frame rate of the image signal input thereto is higher than the predetermined frame rate. The frame rate conversion processing section 56 outputs the image signal after the processing to the overdrive processing section 57. It should be noted that in absence of the instruction from the control section 51 of converting the frame rate, the frame rate conversion processing section 56 outputs the image signal, which is input from the keystone correction processing section 55, directly to the overdrive processing section 57.

The overdrive processing section 57 performs an overdrive process for increasing the response speed of the liquid crystal light valves 13R, 13G, and 13B in the intermediate grayscale level based on the instruction of the control section 51. Specifically, the overdrive processing section 57 adjusts the pixel value so that a higher voltage than usual is applied to the pixel to be set to the intermediate grayscale level, and then outputs the image signal after the adjustment to the liquid crystal drive section 16 of the image projection section 10. Due to the overdrive process, it becomes possible to reduce the residual image when displaying the fast-moving picture (moving image).

The interface section 58 is connected to the frame buffer 40, and performs input and output of the image signal in process between each of the image processing sections 53 through 57 and the frame buffer 40. Specifically, the interface section 58 writes the image signal in process output from each of the image processing sections 53 through 57 into the frame buffer 40, and at the same time reads out the image signal from the frame buffer 40, and outputs it to each of the image processing sections 53 through 57.

Each of the image processing sections 53 through 57 is provided with a compression/decompression processing section 60, and outputs the image signal to the interface section 58 after compressing the image signal by the compression/decompression processing section 60 in order to reduce the amount of data to be transferred when writing the image signal into the frame buffer 40. Therefore, the image signal compressed by the compression/decompression section 60 is stored in the frame buffer 40. Further, when the image processing sections 53 through 57 read out the image signal from the frame buffer 40, the image signal in the compressed state is input by the interface section 58 to the compression/decompression processing section 60, and the process (decompression process) of restoring the image signal from the compressed state is performed by the compression/decompression processing section 60.

Figure 3:
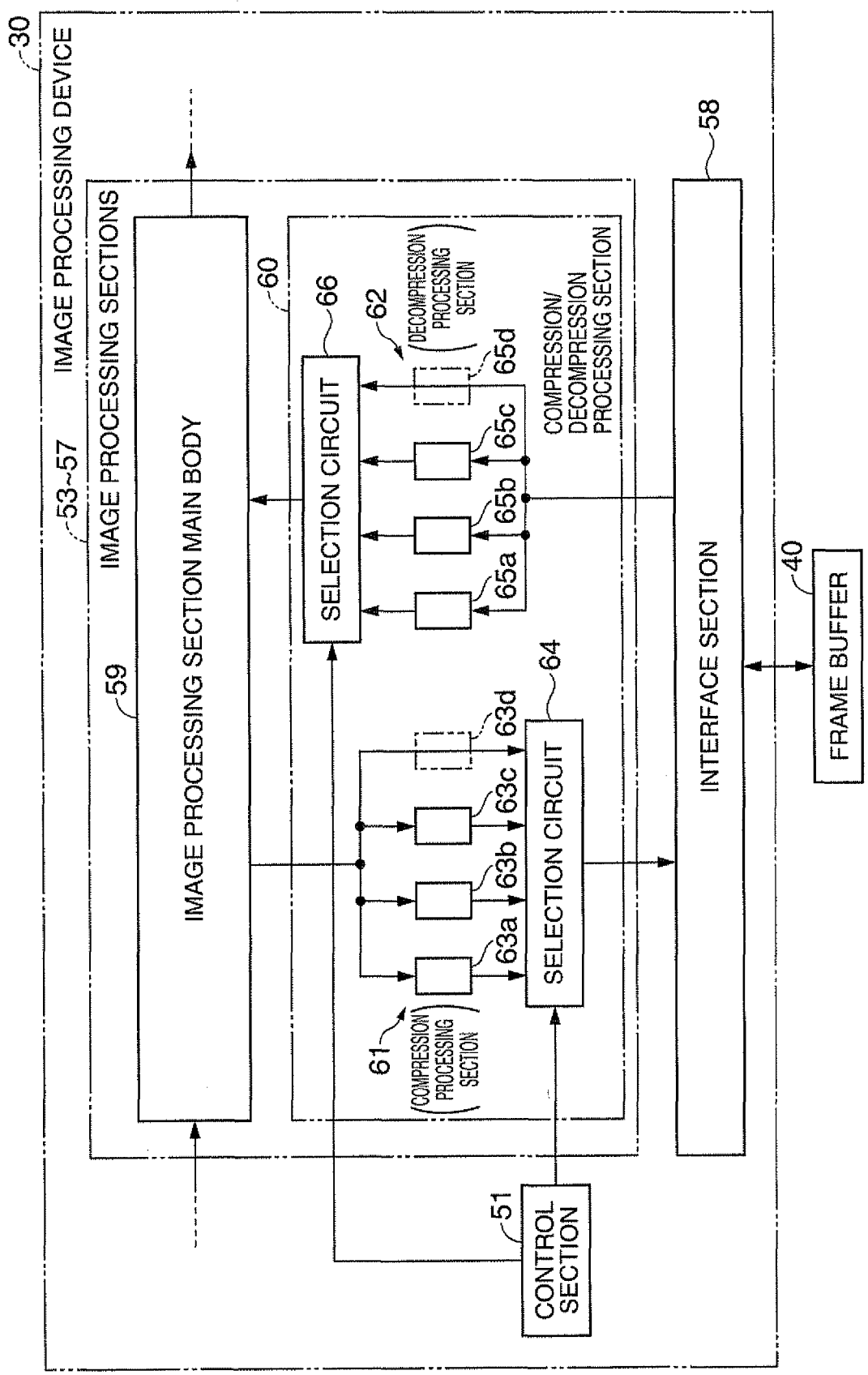
FIG. 3 is a block diagram showing an internal configuration of an image processing section of the embodiment.

FIG. 3 is a block diagram showing an internal configuration of each of the image processing sections 53 through 57.

As shown in FIG. 3, each of the image processing sections 53 through 57 is configured including an image processing section main body 59 for performing a variety of image processing, and the compression/decompression processing section 60, and the compression/decompression processing section 60 includes a compression processing section 61 and a decompression processing section 62.

The compression processing section 61 is for compressing the image signal input from the image processing section main body 59, and then outputting it to the interface section 58, and is configured including three compression circuits 63a, 63b, and 63c, and a selection circuit 64.

The compression circuits 63a through 63c compress the image signal at respective compression rates different from each other. It should be noted that in the present specification it is assumed that the ratio of the amount of data after the compression with respect to the amount of data before the compression is defined as the compression rate, and there is used an expression that the smaller the numerical value is, "the higher the compressibility is." In the present embodiment, the three compression circuits 63a through 63c are configured to be capable of compressing the image signal at the respective compression rates of about 50%, about 70%, and about 90%. In other words, among the three compression circuits 63a through 63c, the compression circuit 63a has the highest compressibility, and the compression circuit 63c has the lowest compressibility. The compression circuits 63a through 63c compress the image signal at the respectively corresponding compression rates, and then output the image signal after the compression to the selection circuit 64. To the selection circuit 64, there is input the image signal before the compression together with the image signals compressed by the respective compression circuits 63a through 63c. Then, the selection circuit 64 selects one image signal based on the instruction of the control section 51 out of the four image signals input thereto, and then outputs it to the interface section 58. It should be noted that the image signal before the compression can be assumed to be compressed by an imaginary compression circuit 63d at a compression rate of 100%. Therefore, in the present embodiment, the control section 51 designates one of the four compression rates of 50%, 70%, 90%, and 100%, and the selection circuit 64 selects the designated compression rate, and thus setting of the compression rate is performed. Then, the image signal compressed at the compression rate thus set is stored in the frame buffer 40 via the interface section 58.

Each of the compression circuits 63a through 63c has a circuit configuration of performing the data compression with hardware, and performs compression using, for example, a differential pulse code modulation (DPCM) coding algorithm for coding the difference in the pixel value between the pixels adjacent to each other. Further, the compression is a lossy compression, and therefore, the higher the compressibility is, the more the information of the detail of the image is lost to thereby degrade the image quality. It should be noted that the compression algorithm is not limited to the above, but a variety of algorithms can be adopted, and there can also be adopted the compression of, for example, only reducing the levels of the grayscale by eliminating the lower bits of the pixel values.

The decompression processing section 62 is for decompressing the compressed image signal input from the interface section 58 and then outputting it to the image processing section main body 59, and is configured including three decompression circuits 65a, 65b, and 65c, and a selection circuit 66.

Each of the decompression circuits 65a through 65c has a circuit configuration of performing the decompression with hardware, and individually decompresses the image signal input from the interface section 58, and then outputs the result to the selection circuit 66. The decompression circuits 65a through 65c are made to correspond respectively to the compression circuits 63a through 63c, and are each configured to be able to restore the image signal compressed by the corresponding compression circuit to the same format as that before the compression. It should be noted that since the compression in the compression circuits 63a through 63c is the lossy compression, the image signal is not restored completely to the state before the compression, but is restored to be in the degraded state. To the selection circuit 66, there is input the image signal without the decompression together with the image signals decompressed by the respective decompression circuits 65a through 65c. Then, the selection circuit 66 selects one image signal based on the instruction of the control section 51 out of the four image signals input thereto, and then outputs it to the image processing section main body 59. It should be noted that the image signal without the decompression is assumed to be output to the selection circuit 66 via an imaginary decompression circuit 65d corresponding to the imaginary compression circuit 63d.

Here, the control section 51 selects the image signal corresponding to the image signal selected in the compression processing section 61. Specifically, if the image signal compressed by the compression circuit 63a is selected in the compression processing section 61, the image signal decompressed by the decompression circuit 65a is selected in the decompression processing section 62, if the image signal compressed by the compression circuit 63b is selected, the image signal decompressed by the decompression circuit 65b is selected, and if the image signal compressed by the compression circuit 63c is selected, the image signal decompressed by the decompression circuit 65c is selected. Further, if the image signal not compressed, namely the image signal passing through the compression circuit 63d, is selected in the compression processing section 61, the image signal without decompression, namely the image signal passing through the decompression circuit 65d, is selected in the decompression processing section 62.

The control section 51 of the present embodiment sets the compression rate of the compression processing section 61 in accordance with the operation circumstances (the load condition) of the image processing device 30. The control section 51 sets the compression rate in accordance with, for example, the load condition of the resizing processing section 53 based on the resolution of the image signal input thereto, the load condition of the frame rate conversion processing section 56 based on the frame rate of the image signal input thereto, or the load condition of the keystone correction processing section 55 based on whether or not the keystone correction is performed and the extent of the correction. Specifically, in the condition in which the image processing device 30 has a relatively heavy load, the more the band frequency (the data transfer capacity) of the frame buffer 40 is apt to become insufficient, the more the control section 51 increase the compressibility to thereby reduce the amount of data to be transferred. In contrast, in the condition in which the image processing device 30 has a relatively low load, the more space exists in the band frequency of the frame buffer 40, the more the control section 51 decreases the compressibility to thereby suppress the degradation of the image quality. It should be noted that it is possible to use the compression rate of the compression processing section 61 in common to all of the image processing sections 53 through 57, or to arrange that the compression rate can be set individually to each of the image processing sections 53 through 57. If it is possible to set the compression rate individually, it becomes possible to perform the compression at an appropriate compression rate in accordance with the processing condition for each of the image processing sections 53 through 57.

As explained hereinabove, according to the image processing device 30 of the present embodiment, the following advantages can be obtained.

1. According to the image processing device 30 of the present embodiment, since it is arranged that the image signal input to and output from the frame buffer 40 is compressed, and at the same time the compression rate used when performing the compression can be set, it becomes possible to set an appropriate compression rate corresponding to the operation circumstances (the load condition), and it becomes possible to efficiently perform the image processing using the frame buffer 40.

2. According to the image processing device 30 of the present embodiment, since there is adopted the configuration in which the selection circuit 64 selects one of the image signals respectively compressed by the plurality of compression circuits 63a through 63d, it becomes possible to realize the setting of the compression rate with a simple configuration.

3. According to the image processing device 30 of the present embodiment, since each of the image processing sections 53 through 57 for performing the respective image processing different from each other has the compression/decompression processing section 60, the control of the compression and the decompression, and the control of the input and the output of the frame buffer 40 become easy.

It should be noted that in the present embodiment the control section 51 and the selection circuit 64 function as the compression rate setting section. Further, the interface section 58 corresponds to the interface section.

MODIFIED EXAMPLES

Further, the embodiment described above can also be modified as follows.

Figure 4:
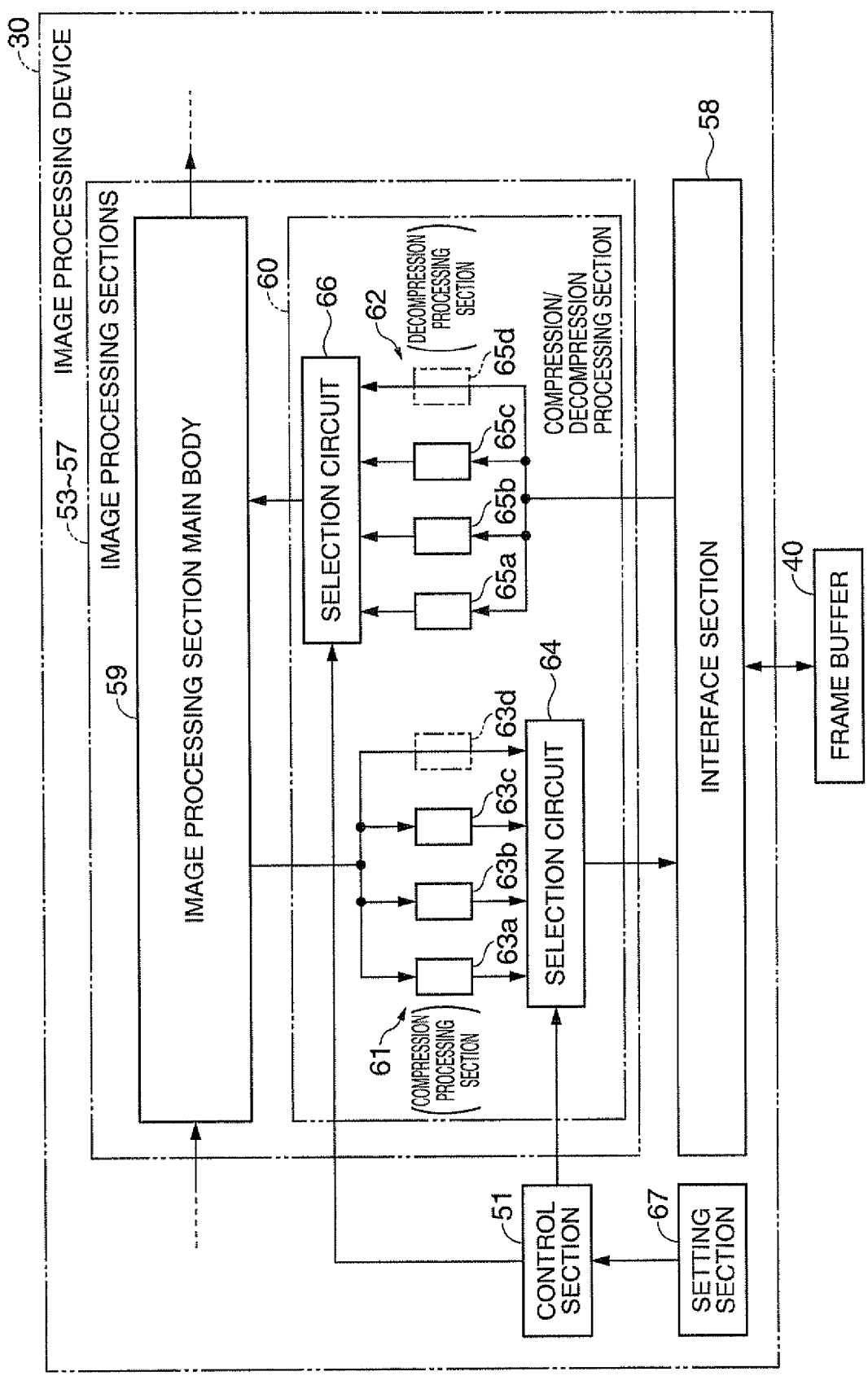
FIG. 4 is a block diagram showing an internal configuration of an image processing section according to a modified example.

Although in the embodiment described above the control section 51 sets the compression rate in accordance with the load condition, the invention is not limited to this configuration. It is also possible to, for example, arrange that a setting section 67 formed of a nonvolatile memory for storing the setting content, a jumper switch, or the like is provided to the image processing device 30 as shown in FIG. 4, and the control section 51 performs the setting of the compression rate in accordance with the setting content of the setting section 67. According to such a configuration as described above, since it results that the compression process is performed using a predetermined compression rate set previously, it is possible to set the compression rate corresponding to the use environment and so on using the setting section 67 although it is not possible to vary the compression rate dynamically in accordance with the operation circumstances and so on. For example, in the case of installing the image processing device 30 in a high-priced product to which high image quality is required, it is possible to arrange that the number of DRAMs is increased to thereby achieve the band frequency while setting the compressibility to a low level by the setting section 67 to thereby suppress the deterioration of the image quality. Further, in the case of installing the image processing device 30 to a low-priced product in which lower image quality than in the high-priced product is allowed, it is possible to arrange that the number of DRAMs is decreased, and at the same time the compressibility is set to a high level by the setting section 67 to thereby compensate the shortage of the band frequency. As a result, it becomes possible to use the same image processing device 30 commonly to both of the low-priced product and the high-priced product, and thus the versatility of the image processing device 30 is enhanced. It should be noted that in such a configuration the control section 51, the setting section 67, and the selection circuit 64 function as the compression rate setting section. Further, it is also possible to adopt the configuration of allowing the user to use the menu image or the like to designate the compression rate, and storing the designated compression rate to the setting section 67 (a memory device).

Further, it is also possible to arrange that the selection range (alternatives) of the compression rate can be switched in accordance with the setting of the setting section 67. For example, it is also possible to arrange that in the case of setting the setting section 67 to a first setting, the control section 51 designates one of the compression rates of 50%, 70%, and 90% in accordance with the load condition or the like, and in the case of setting the setting section 67 to a second setting, the control section 51 designates one of the compression rates of 70%, 90%, and 100% in accordance with the load condition or the like. In such a configuration, the control section 51 is arranged to be able to designate either one of a plurality of compression rates (50%, 70%, 90%, and 100%), and in the case of setting the setting section 67 to the first setting, the control section 51 is allowed to designate the compression rate from a part (50%, 70%, and 90%) of the plurality of compression rates described above. Further, in the case of setting the setting section 67 to the second setting different from the first setting, the control section 51 is allowed to designate the compression rate from a part (70%, 90%, and 100%) of the compression rates, the part including the compression rate (100%) which is not allowed to be designated in the first setting. To the contrary, in the case of setting the setting section 67 to the first setting, the control section 51 is allowed to designate the compression rate from the part (50%, 70%, and 90%) of the compression rates, the part including the compression rate (50%) which is not allowed to be designated in the second setting.

In the embodiment described above, it is not necessary that all of the image processing sections 53 through 57 are each provided with the compression/decompression processing section 60, and it is also possible to arrange that, for example, among the plurality of image processing sections described above, one or more image processing sections (e.g., the keystone correction processing section 55 and the frame rate conversion processing section 56) with a higher processing load than the other image processing sections are only provided with the compression/decompression processing section 60.

Although in the embodiment described above the image processing device 30 is provided with the five image processing sections 53 through 57 (the resizing processing section 53, the OSD processing section 54, the keystone correction processing section 55, the frame rate conversion processing section 56, and the overdrive processing section 57), it is not necessary to provide all of these image processing sections 53 through 57. Further, the configuration provided with other image processing sections than those described above can also be adopted. In the case of, for example, providing an image processing section for performing a process for making the right and left eyes of the viewer visually recognize respective pictures different from each other to thereby make the viewer recognize a stereoscopic image, since the load is apt to become heavy due to this process, significance of the advantage that the compression rate of the image signal can be set is further enhanced.

Although in the embodiment described above the three-panel projector 1 using the three liquid crystal light valves 13R, 13G, and 13B is explained, the invention is not limited thereto. The invention can also be applied to, for example, a single-plate projector 1 capable of modulating the R light, the G light, and the B light with a single liquid crystal light valve.

Although in the embodiment described above the transmissive liquid crystal light valves 13R, 13G, and 13B are used as the light modulation devices, it is also possible to use reflective light modulation devices such as reflective liquid crystal light valves. Further, it is also possible to use a micromirror array device for modulating the light emitted from the light source by controlling the emission direction of the incident light for every micromirror as a pixel.

Although in the embodiment described above, the illumination optical system 11 is configured with the discharge light source lamp 11a, a sold-state light source such as a light emitting diode (LED) light source or a laser source, and other light sources can also be used therefor.

Although in the embodiment described above the example of installing the image processing device 30 to the projector is described, the invention is not limited to this configuration. It is also possible to arrange that, for example, the image processing device 30 is installed in image display devices (e.g., a liquid crystal display, a plasma display, and an organic electro-luminescence (EL) display) other than the projector 1.

The entire disclosure of Japanese Patent Application No. 2011-148006, filed Jul. 4, 2011 is expressly incorporated by reference herein.

What is claimed is:

1. An image processing device adapted to perform image processing on an image signal input, and then output the image signal, the image processing device comprising:
   an interface section adapted to perform input and output of the image signal and connected with a storage device to be connected to the image processing device;
   an input determination processor adapted to determine a resolution and a frame rate of the input image signal;
   a resizing processor section adapted to perform a resizing process to adjust the resolution of the input image signal to fit a display size based on the resolution determined by the input determination processor section;
   a compression processing section adapted to compress the input image signal output from the resizing processor section, wherein the compression processing section includes a plurality of compression circuits capable of compressing the input image signal from the resizing processor section at respective compression rates different from each other; and
   a compression rate setting processor section adapted to set a compression rate used when compressing the input image signal in the compression processing section based on the frame rate determined by the input determination processor section, the compression rate setting processor section selecting the input image signal compressed by one of the plurality of compression circuits, wherein the plurality of compression circuits output corresponding compressed signals for the input image signal and the compression rate setting section is further adapted to select one of the corresponding compressed signals.

2. The image processing device according to claim 1, wherein
   the compression rate setting processor section changes the compression rate in accordance with a load condition of the image processing.

3. The image processing device according to claim 1, further comprising:
   a plurality of image processor sections adapted to perform respective image processing different from each other,
   wherein each of the plurality of image processor sections includes the compression processing section.

4. The image processing device according to claim 3, wherein
   the compression rates of the respective compression processing sections provided to the respective image processor sections can be set individually.

5. The image processing device according to claim 1, further comprising:
   a frame rate conversion processor section adapted to convert the frame rate of the image signal,
   wherein the compression processing section performs the compression of the image signal output from the frame rate conversion processor section to the storage device.

6. The image processing device according to claim 1, further comprising:
   a keystone correction processor section adapted to correct keystone distortion caused when projecting an image based on the image signal,
   wherein the compression processing section performs the compression of the image signal output from the keystone correction processor section to the storage device.

7. The image processing device according to claim 1, further comprising:
   a decompression processor section adapted to decompress the image signal input from the storage device into the interface section.

8. The image processing device according to claim 1, wherein
   the plurality of compression circuits are adapted to compress the image signal at the respective compression rates in parallel.

9. An image display device comprising:
   the image processing device according to claim 1;
   the storage device; and a display section adapted to display an image based on the image signal output from the image processing device.

10. A projector comprising:
the image processing device according to claim 1;
the storage device; and
a projection section adapted to display an image based on the image signal output from the image processing device.

11. A projector comprising:
the image processing device according to claim 2;
the storage device; and
a projection section adapted to display an image based on the image signal output from the image processing device.

12. A projector comprising:
the image processing device according to claim 3;
the storage device; and
a projection section adapted to display an image based on the image signal output from the image processing device.

13. A projector comprising:
the image processing device according to claim 4;
the storage device; and
a projection section adapted to display an image based on the image signal output from the image processing device.

14. A projector comprising:
the image processing device according to claim 5;
the storage device; and
a projection section adapted to display an image based on the image signal output from the image processing device.

15. A projector comprising:
the image processing device according to claim 6;
the storage device; and
a projection section adapted to display an image based on the image signal output from the image processing device.

16. A projector comprising:
the image processing device according to claim 7;
the storage device; and
a projection section adapted to display an image based on the image signal output from the image processing device.

* * * * *